United States Patent
Gabel

(10) Patent No.: US 8,453,429 B2
(45) Date of Patent: Jun. 4, 2013

(54) SYSTEM AND METHOD FOR ASSEMBLING A THRUST REVERSER FOR A GAS TURBINE PROPULSION SYSTEM

(75) Inventor: Martin Kenneth Gabel, Mason, OH (US)

(73) Assignee: General Electric Company, Schenectady, NY (US)

( * ) Notice: Subject to any disclaimer, the term of this patent is extended or adjusted under 35 U.S.C. 154(b) by 1009 days.

(21) Appl. No.: 12/495,248

(22) Filed: Jun. 30, 2009

(65) Prior Publication Data

US 2010/0326047 A1 Dec. 30, 2010

(51) Int. Cl.
*F02K 1/72* (2006.01)

(52) U.S. Cl.
USPC .................. 60/226.2; 239/265.31; 244/110 B

(58) Field of Classification Search
CPC ....................................................... F02K 1/72
USPC ................... 60/226.2, 230, 232; 239/265.29, 239/265.31, 265.33; 244/110 B
See application file for complete search history.

(56) References Cited

U.S. PATENT DOCUMENTS

| | | | |
|---|---|---|---|
| 3,621,763 A | 11/1971 | Geyer | |
| 4,232,516 A | 11/1980 | Lewis | |
| 4,533,098 A * | 8/1985 | Bonini et al. | 244/110 B |
| 6,000,216 A | 12/1999 | Vauchel | |
| 6,212,877 B1 * | 4/2001 | Renggli | 60/232 |
| 6,240,797 B1 | 6/2001 | Morishima et al. | |
| 6,309,131 B1 | 10/2001 | Dawson | |
| 6,415,599 B1 * | 7/2002 | Ausdenmoore et al. | 60/230 |
| 6,487,846 B1 | 12/2002 | Chakkera et al. | |
| 6,546,715 B1 | 4/2003 | Blevins | |
| 6,974,107 B2 | 12/2005 | Christensen et al. | |
| 7,097,154 B2 | 8/2006 | Stevens | |
| 7,162,968 B2 | 1/2007 | Thompson | |
| 2008/0179971 A1 | 7/2008 | Quitmeyer et al. | |

OTHER PUBLICATIONS

Search Report and Written Opinion from corresponding Spanish Application No. 201030977, dated Nov. 8, 2012.

* cited by examiner

*Primary Examiner* — Andrew Nguyen
(74) *Attorney, Agent, or Firm* — General Electric Company; William Scott Andes; Sushupta T. Sudarshan

(57) ABSTRACT

A method of assembling a thrust reverser assembly for use in an aircraft gas turbine propulsion system. The method includes coupling a translating cowl to a fixed cowling, such that the translating cowl at least partially covers an engine, and is movable between an open position and a closed position. A rod end assembly is coupled to the translating cowl and an actuator is coupled to the rod end assembly, such that the actuator is movable between a first position and a second position. A torque bracket is coupled to the rod end assembly. The torque bracket includes at least two arms that each extend outward from the rod end assembly, such that a bending loading induced to the rod end assembly is induced to the translating cowl by the torque bracket.

19 Claims, 7 Drawing Sheets

SYSTEM AND METHOD FOR ASSEMBLING A THRUST REVERSER FOR A GAS TURBINE PROPULSION SYSTEM

BACKGROUND OF THE INVENTION

The field of the invention relates generally to aircraft gas turbine propulsion systems, and more particularly to a thrust reverser assembly for use with a gas turbine propulsion system.

At least some known turbofan propulsion systems include a thrust reverser assembly. At least some known thrust reverser assemblies include a first fixed cowl and a second cowl that is axially translatable with respect to the first cowl. More specifically, in some known thrust reverser assemblies, an actuator coupled to the second cowl is actuated to reposition the second cowl with respect to the first cowl. As the second cowl is repositioned, airflow discharged from the fan nozzle duct is channeled through the thrust reverser actuation system. However, during operation of the thrust reverser assembly, bending forces from movement of the cowl are imparted on the thrust reverser assembly. Over time, depending on the use of the thrust reverser assembly and the duration and strength of such forces, damage may occur to the cowl and gas turbine propulsion system. For example, stress fatigue may induce cracks into portions of the thrust reverser actuation system. Accordingly, it is desirable to provide a method and/or system for reducing the bending forces exerted on the thrust reverser actuation system during operation.

BRIEF DESCRIPTION OF THE INVENTION

In one aspect, a method of assembling a thrust reverser assembly for use in an aircraft gas turbine propulsion system is provided. The method includes coupling a translating cowl to a fixed cowling, such that the translating cowl at least partially covers an engine, and is movable between an open position and a closed position. A rod end assembly is coupled to the translating cowl and an actuator is coupled to the rod end assembly, such that the actuator is movable between a first position and a second position. A torque bracket is coupled to the rod end assembly. The torque bracket includes at least two arms that each extend outward from the rod end assembly, such that a bending loading induced to the rod end assembly is induced to the translating cowl by the torque bracket.

In another aspect, a thrust reverser assembly for use in an aircraft gas turbine propulsion system is provided. The thrust reverser assembly includes a translating cowl at least partially covering an engine and slideably coupled to a fixed cowling and movable between an open position and a closed position. A rod end assembly is coupled to the translating cowl, and an actuator coupled to the rod end assembly for moving the translating cowl between the open and closed positions. A torque bracket that includes at least two arms is coupled to the rod end assembly, each arm extending outward from the rod end assembly. The torque bracket is oriented to transfer a bending loading induced to the rod end assembly to the translating cowl.

In yet another aspect, a gas turbine propulsion system for use in an aircraft is provided. The gas turbine propulsion system includes an engine that includes an inlet end, an exhaust end, and a thrust reverser assembly. The thrust reverser assembly includes a translating cowl at least partially covering the engine and slideably coupled to a fixed cowling, and movable between a first position and a second position, wherein the second position is defined nearer to the exhaust end than the first position. A rod end assembly is coupled to the translating cowl, and an actuator is coupled to the rod end assembly for moving the translating cowl between the open and closed positions. A torque bracket that includes at least two arms is coupled to the rod end assembly. The torque bracket is oriented to transfer a bending loading induced to the rod end assembly to the translating cowl.

The embodiments described herein facilitate translating the bending loading induced to the actuator assembly to the translating cowl. As a result, the bending loading experienced by the actuator assembly during operation of the thrust reverser assembly is facilitated to be reduced.

BRIEF DESCRIPTION OF THE DRAWINGS

FIG. 1 is a side view of an exemplary aircraft gas turbine propulsion system mounted to an aircraft wing and including an exemplary thrust reverser assembly;

FIG. 2 is a partial side sectional view of the thrust reverser assembly shown in FIG. 1 in a first operational position;

FIG. 3 is a partial side sectional view of the thrust reverser assembly shown in FIGS. 1 and 2 in a second operational position;

FIG. 4 is a partial side view of an exemplary actuator assembly that may be used with the thrust reverse assembly shown in FIG. 1;

FIG. 5 is an exploded perspective view of the actuator assembly shown in FIG. 4;

FIG. 6 is an enlarged perspective view of an exemplary cowl attachment assembly that may be used with the thrust reverser assembly shown in FIG. 1; and FIG. 7 is a partially exploded perspective view of the actuator assembly shown in FIG. 4.

DETAILED DESCRIPTION OF THE INVENTION

The embodiments described herein include a thrust reverser assembly for use in a gas turbine propulsion system. The thrust reverser assembly facilitates reducing the bending loads formed during operation of the thrust reverser assembly. More specifically, the methods and systems described herein facilitate reducing the bending loads induced to the actuator assemblies when a cowl is moved between forward and aft positions. The following detailed description illustrates exemplary methods and systems by way of example and not by way of limitation. The description enables one of ordinary skill in the art to make and use the disclosure, and the description describes several embodiments of the disclosure, including what is presently believed to be the best mode of carrying out the disclosure. However, it is contemplated that this disclosure has general application to thrust reversers in a broad range of systems and in a variety of industrial and/or consumer applications.

Figure 1:
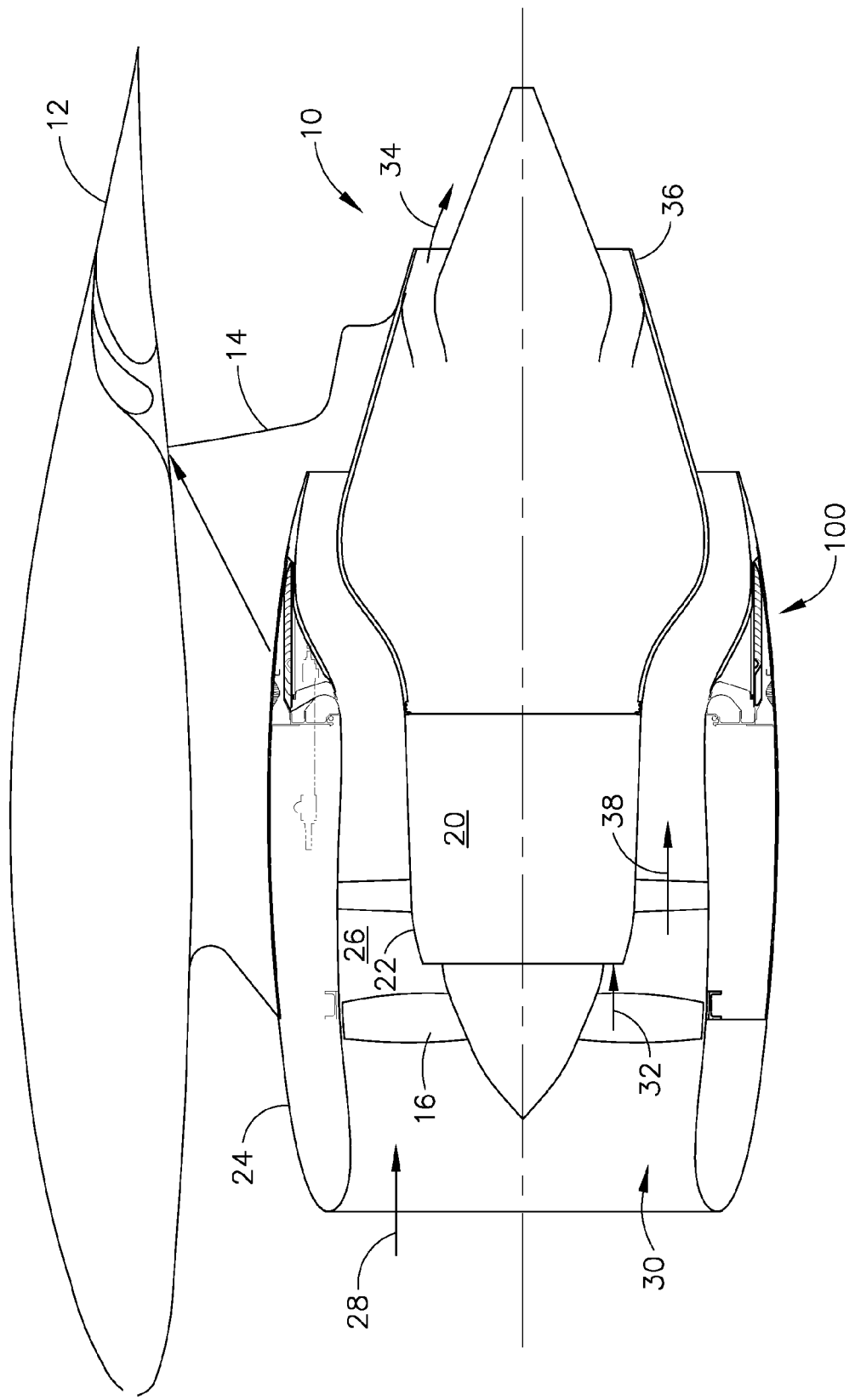
FIGS. 1-7 illustrate exemplary embodiments of the system and methods described herein.

FIG. 1 is a side view of exemplary aircraft gas turbine propulsion system 10 that is coupled to an aircraft wing 12 and that includes an exemplary thrust reverser assembly 100. In the exemplary embodiment, gas turbine propulsion system 10 is mounted to a wing 12 of an aircraft using a pylori 14 and includes a fan 16 that is powered by a core gas turbine engine 20. Core gas turbine engine 20 includes a compressor, combustor, and high and low pressure turbines (all not shown), wherein the high pressure turbine drives the compressor, and the low pressure turbine drives fan 16.

In the exemplary embodiment, core gas turbine engine 20 is enclosed in an annular core cowl 22, and a fan nacelle 24 surrounds the fan 16 and a portion of the core engine 20. An annular bypass duct 26 is defined between a portion of core cowl 22 and a portion nacelle 24.

During operation, ambient air 28 enters an inlet end 30 of gas turbine propulsion system 10 and flows through fan 16. A first portion 32 of airflow 28 is channeled through core gas turbine engine 20, compressed, mixed with fuel, and ignited for generating combustion gases 34 that are discharged from an exhaust end 36 of core gas turbine engine 20. A second portion 38 of airflow 28 is channeled downstream through bypass duct 26 to an exemplary thrust reverser assembly 100.

Figure 2:
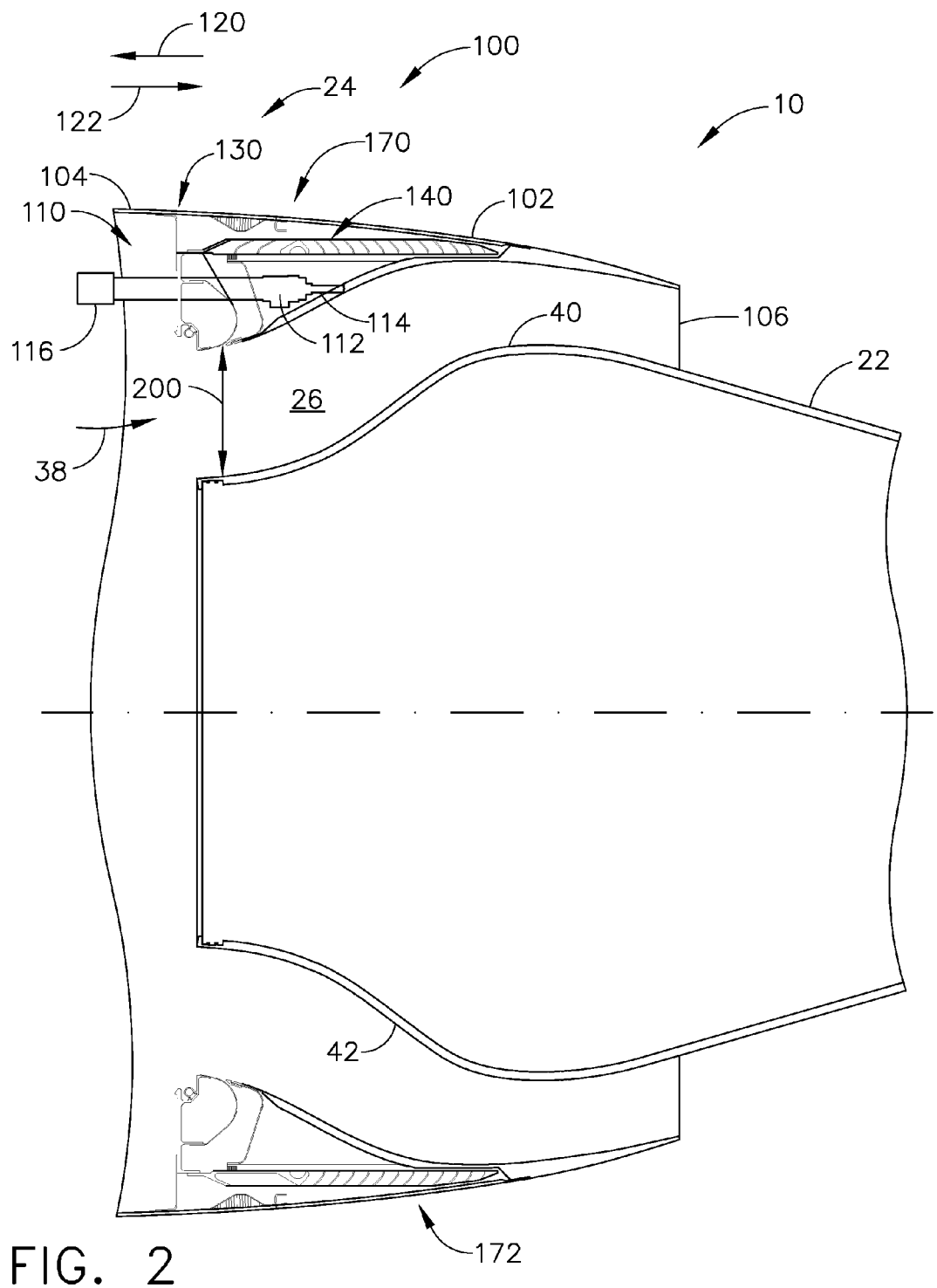

FIG. 2 is a partial side sectional view of thrust reverser assembly 100 in a first operational position 130. In the exemplary embodiment, thrust reverser assembly 100 includes a translating aft cowl 102 that is slideably coupled to a stationary fixed cowling 104 to form nacelle 24. Aft cowl 102 includes an aft or downstream end that, with a portion of core cowl 22, defines a discharge fan nozzle 106 having an area sized to enable airflow second portion 38, that is channeled through bypass duct 26, to be discharged through fan nozzle 106 during selected operations. In the exemplary embodiment, thrust reverser assembly 100 also includes an actuator assembly 110 that is coupled to aft cowl 102 to facilitate selectively axially translating aft cowl 102 relative to fixed cowling 104.

In the exemplary embodiment, actuator assembly 110 includes a plurality of circumferentially-spaced apart actuators 112 and a plurality of extending rods 114, such as ball screws. At least one of the plurality of extending rods 114 is coupled to at least one actuator 112 and to aft cowl 102, such that energizing actuators 112 facilitates moving or translating aft cowl 102 in either a forward direction 120 or in an aft direction 122. A center drive unit 116 is coupled to actuator 112. In the exemplary embodiment, actuator assembly 110 may be electrically, pneumatically, or fluidly powered to facilitate axially translating aft cowl 102 from a first or closed position 130 wherein cowl 102 is fully retracted against fixed cowling 104, to a second or open position 134 (shown in FIG. 3) wherein aft cowl 102 is fully extended from fixed cowling 104 in aft direction 122.

Thrust reverser assembly 100 also includes a plurality of cascade turning vanes 140, referred to herein as a cascade box 140, that are between, or at a juncture of, aft and fixed cowls 102 and 104, respectively, and that are selectively uncovered upon axial translation of aft cowl 102. Cascade box 140 includes a first portion 170 that has a substantially semi-cylindrical shape that extends about an upper surface 40 of core gas turbine engine 20 and a second portion 172 that has a substantially semi-cylindrical shape that extends about a lower surface 42 of core gas turbine engine 20. As such, cascade box 140 extends substantially circumferentially about core gas turbine engine 20.

As shown in FIG. 2, aft cowl 102 is positioned in a first operational position 130, also known as a stowed configuration, such that cascade box 140 is substantially covered by aft cowl 102 and such that fan air 38 is channeled through bypass duct 26 and is discharged through fan nozzle 106.

Figure 3:
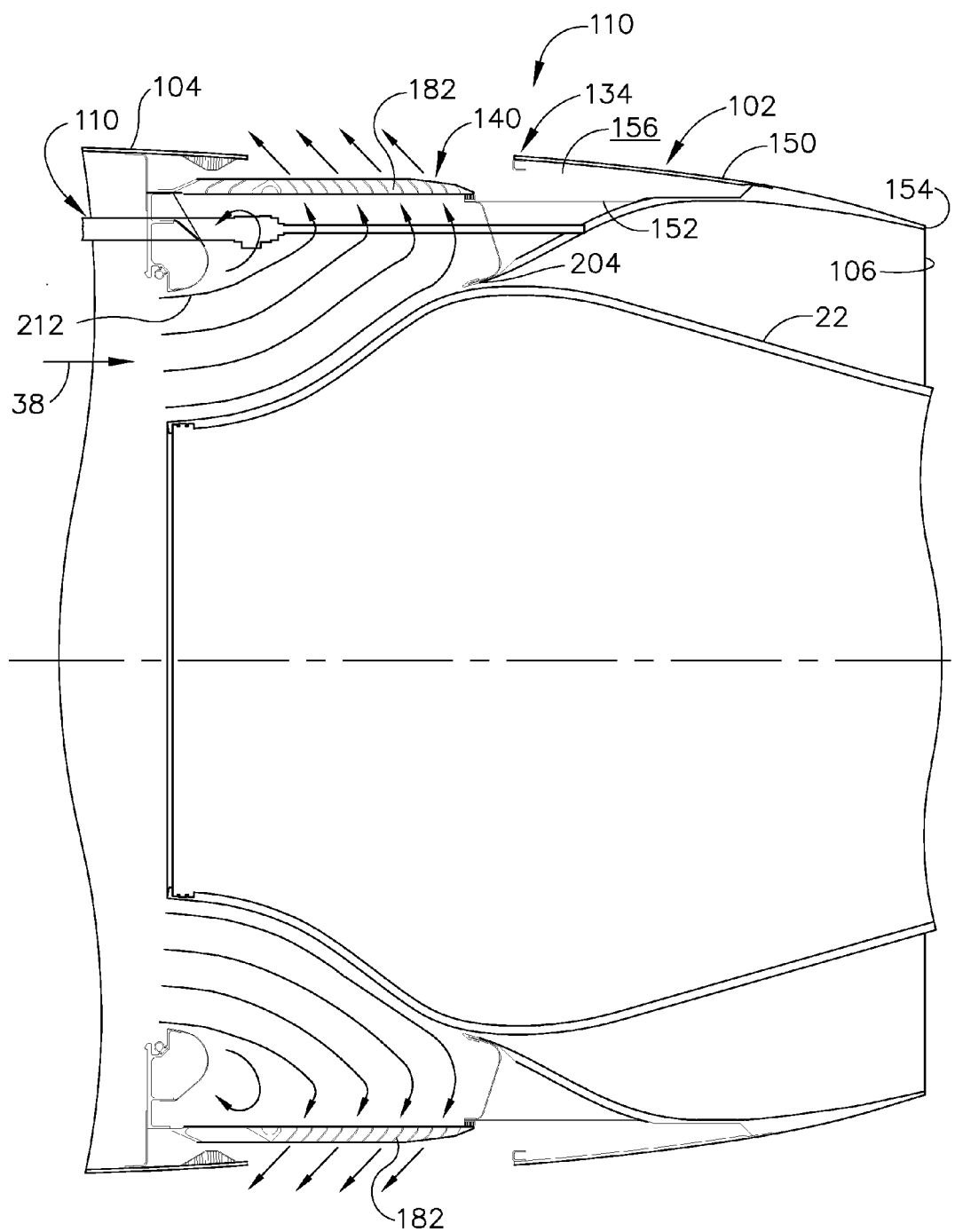

FIG. 3 is a partial side sectional view of thrust reverser assembly 100 in a second operational position 134. As shown in FIG. 3, aft cowl 102 includes an outer panel 150 and a radially inner panel 152 that is coupled to radially outer panel 150 at an aft cowl trailing edge 154. In the exemplary embodiment, outer panel 150 and inner panel 152 define a cavity 156 therebetween. Cavity 156 is sized to house cascade box 140 when aft cowl 102 is in the stowed position. In the exemplary embodiment cascade box 140 includes a first plurality of cascade turning vanes 182 that are oriented to channel airflow 38 within bypass duct 26 through cascade box 140 generally in direction 120 with respect to core gas turbine engine 20. In an alternative embodiment, cascade box 140 includes a second plurality of turning vanes (not shown) that are oriented to channel airflow 38 through cascade box 140 is a substantially aft direction 122 with respect to core gas turbine engine 20.

During a first mode of operation, aft cowl 102 is positioned in the first or stowed position 130, such that a first dimension 200 is defined between core cowl 22 and aft cowl 102, and such that airflow 38 channeled through bypass duct 26 is discharged through fan nozzle 106. As such, when aft cowl 102 is in the stowed position 130, airflow 38 is substantially prevented from flowing through cascade box 140. In the exemplary embodiment, aft cowl 102 is positioned in the stowed position 130 when the aircraft is operating in a cruise mode, i.e., during normal flight conditions.

Optionally, when the aircraft has landed, and an operator desires to effect reverse thrust, aft cowl 102 is moved from first position 130 to second position 134, such that a second dimension 204 is defined between core engine cowl 22 and aft cowl 102, and such that a second quantity 212 of airflow 38 is channeled through turning vanes 182. In the exemplary embodiment, second dimension 204 is smaller than first dimension 200, such that a majority of airflow 38 is channeled through cascade box 140, and such that the total quantity of airflow 38 channeled through fan nozzle 106 is reduced when aft cowl 102 is in second position 134. More specifically, actuator assembly 110 is operated to facilitate moving aft cowl 102 to second position 134. As shown in FIG. 3, when aft cowl 102 is in second position 134, airflow 38 is channeled through cascade turning vanes 182 to facilitate effecting reverse thrust to slow the aircraft.

Figure 4:
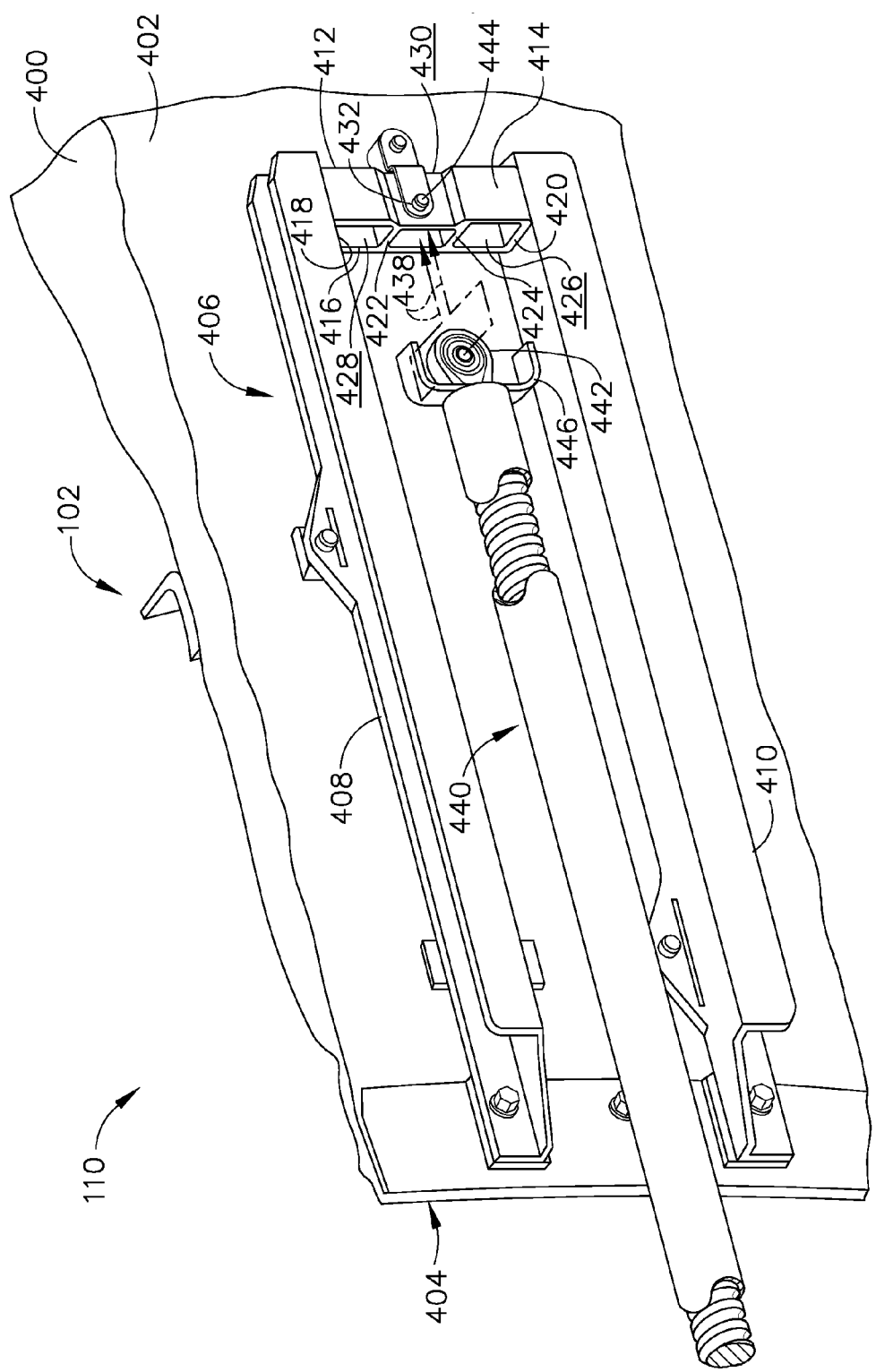

FIG. 4 is a partial side view of actuator assembly 110. Aft cowl 102 includes a sidewall 400, an outer surface 402 coupled to sidewall 400, a forward section 404, and an aft section (not shown) that is opposite forward section 404. In first position 130, forward section 404 is adjacent to fixed cowling 104. A longeron assembly 406 is coupled to outer surface 402 and is positioned proximate to forward section 404. More specifically, longeron assembly 406 extends from forward section 404 towards the aft section (not shown) of aft cowl 102. Longeron assembly 406 includes two C-channel rails 408 and 410 and a clevis bracket 412. Rails 408 and 410 are positioned substantially parallel to each other and extend from forward section 404 towards the aft end (not shown) of aft cowl 102.

Clevis bracket 412 is positioned between rails 408 and 410 and is oriented substantially perpendicular to rails 408 and 410. Clevis bracket 412 includes front sidewall 414, back sidewall 416, end wall 418, opposing end wall 420, and interior walls 422 and 424. Front sidewall 414 extends from rail 408 to rail 410. End walls 418 and 420 each extend inward from front sidewall 414 and are coupled to opposing ends of front sidewall 414. Back sidewall 416 is positioned opposite front sidewall 414 and extends between rails 408 and 410. Back sidewall 416 is coupled to end wall 418 and 420 at opposing ends of back sidewall 416. Interior walls 422 and 424 extend between front sidewall 414 and back sidewall 416 and are coupled to front sidewall 414 and back sidewall 416 such that end cavity 426 is defined between interior wall 424 and end wall 420, and such that end cavity 428 is defined between interior wall 422 and end wall 418. Center cavity 430 is defined between opposing interior walls 422 and 424. Opening 432 extends through front sidewall 414 and is substantially centered within front sidewall 414.

Clevis bracket end walls 418 and 420 are each coupled to rails 408 and 410 respectively, such that clevis bracket 412 is secured in position between rails 408 and 410. Rails 408 and 410 are each coupled to aft cowl outer surface 402 using a series of bolts, welds, or any other suitable attachment device, such that longeron assembly 406 remains secured in position relative to aft cowl 102. An assembly (not shown) similar to longeron assembly 406 is coupled to fixed cowling 104 opposite longeron assembly 406 and is slideably coupled to longeron assembly 406 such that aft cowl 102 is slideable relative to fixed cowling 104.

Actuator assembly 110 is coupled to clevis bracket 412 such that aft cowl 102 will move between first position 130 and second position 134 upon operation of actuator assembly 110. Actuator assembly 110 includes rod assembly 440, and rod assembly 440 is inserted into clevis bracket 412 as shown by arrows 438. Rod end 442 is inserted into cavity 430 and is coupled to front sidewall 414 and back sidewall 416. Clevis pin 444 is inserted into opening 432 and through rod end 442 such that rod end 442 is rotatably coupled to clevis bracket 412. Torque bracket 446 is then inserted into cavities 426 and 428.

Figure 5:
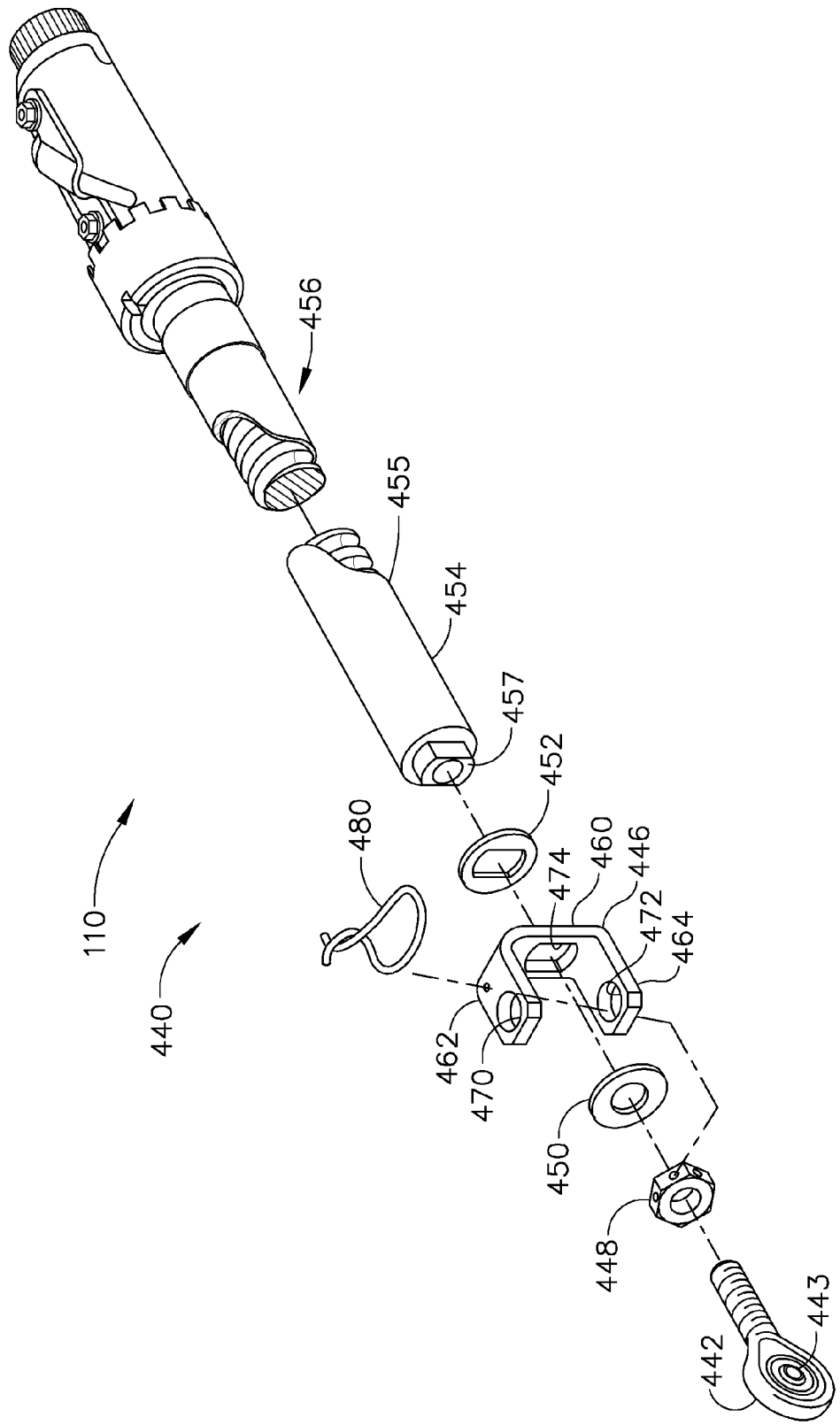

FIG. 5 is an exploded perspective view of actuator assembly 110. In the exemplary embodiment, rod assembly 440 includes a rod end 442, a nut 448, a washer 450, a spacer 452, a torque bracket 446, and an extension tube 454. Torque bracket 446 includes a base member 460, a first arm 462 and an opposing second arm 464. First arm 462 is coupled to base member 460 and extends substantially perpendicularly outward from base member 460. Second arm 464 is coupled to base member 460 and extends outwardly from base member 460 substantially parallel to first arm 462, such that first arm 462 and second arm 464 are in an opposing relationship. First arm 462 includes an opening 470 that at least partially extends through first arm 462 and is configured to facilitate reducing a weight of torque bracket 446. Second arm 464 includes an opening 472 that at least partially extends through second arm 464. In an alternative embodiment first arm 462 and/or second arm 464 do not include openings 470 and/or 472. In the exemplary embodiment, openings 470 and 472 are substantially circular, however, openings 470 and 472 can have any shape or configuration that enables rod assembly 440 to perform as described herein. Base member 460 includes an opening 474 that extends through base member 460. Extension tube 454 includes a shaft 455 that extends from root end 456 to tip end 457. Tip end 457 is sized and shaped to be at least partially insertable through base opening 474. Base opening 474 is also sized and oriented to receive rod end 442. Washer 450 and spacer 452 are sized and shaped to receive extension tube tip end 457 therethrough. In the exemplary embodiment, base opening 474 is double-D shaped, however, base opening 474 may have any shape that enables rod assembly 440 to perform as described herein. Opening 443 extends through rod end 442, and is sized and shaped such that a clevis pin (not shown) is insertable through rod end 442 to enable rod end 442 to be rotatably coupled to clevis bracket 412. In the exemplary embodiment, extension tube 454 is inserted through base opening 474, such that rod end 442 is coupled to extension tube 454 through torque bracket 446. Spacer 452 is positioned between extension tube 454 and torque bracket 446, and washer 450 is positioned between torque bracket 446 and rod end 442. Nut 448 is coupled to rod end 442 and secures rod end 442 to torque bracket 446. A non-slip device 480 is coupled to torque bracket 446 and to nut 448 to prevent nut 448 from rotating during operation of rod assembly 440. Rod end 442 is coupled to torque bracket 446, such that first arm 462 and second arm 464 extend towards rod end 442.

Figure 6:
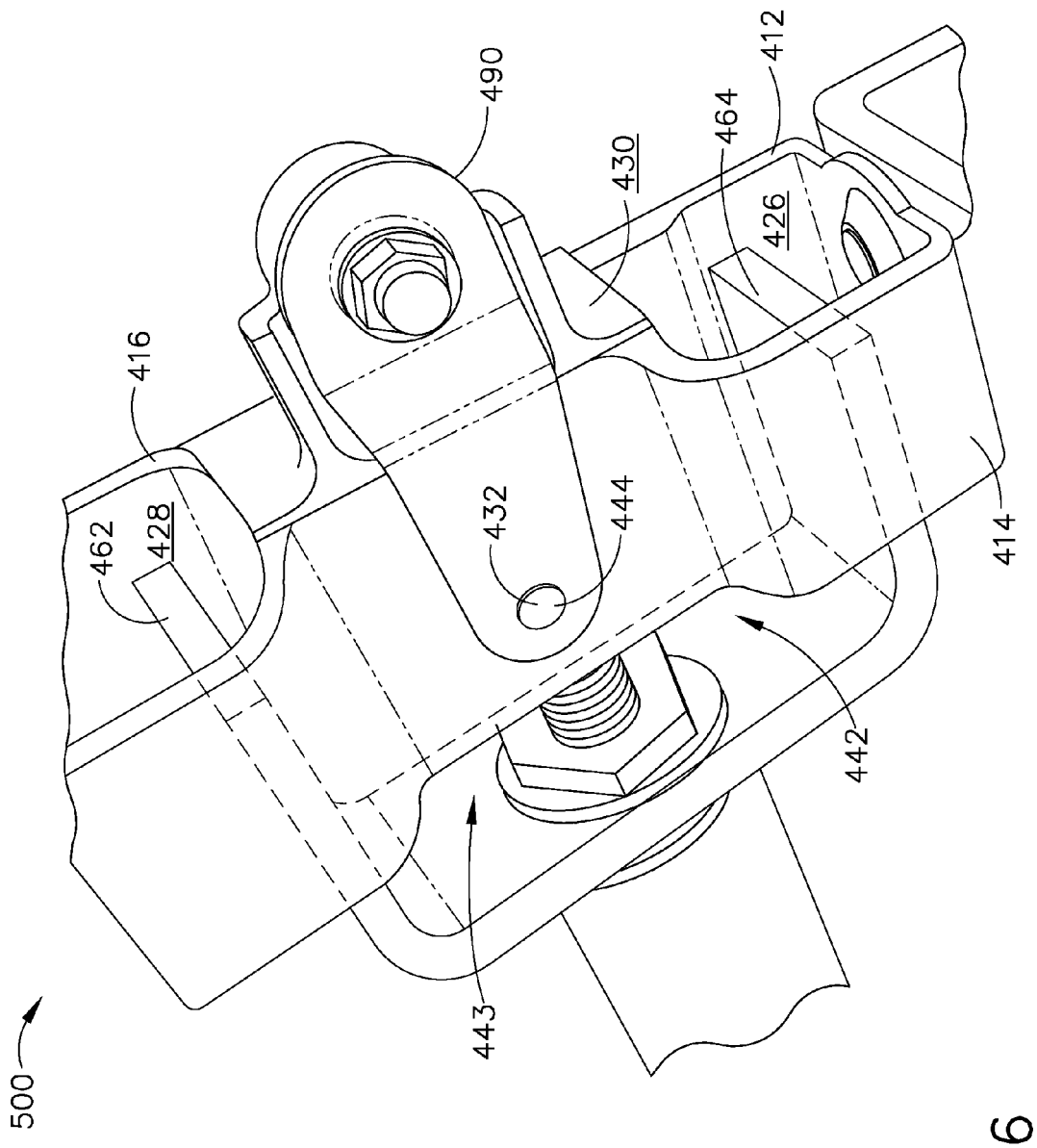
Figure 7:
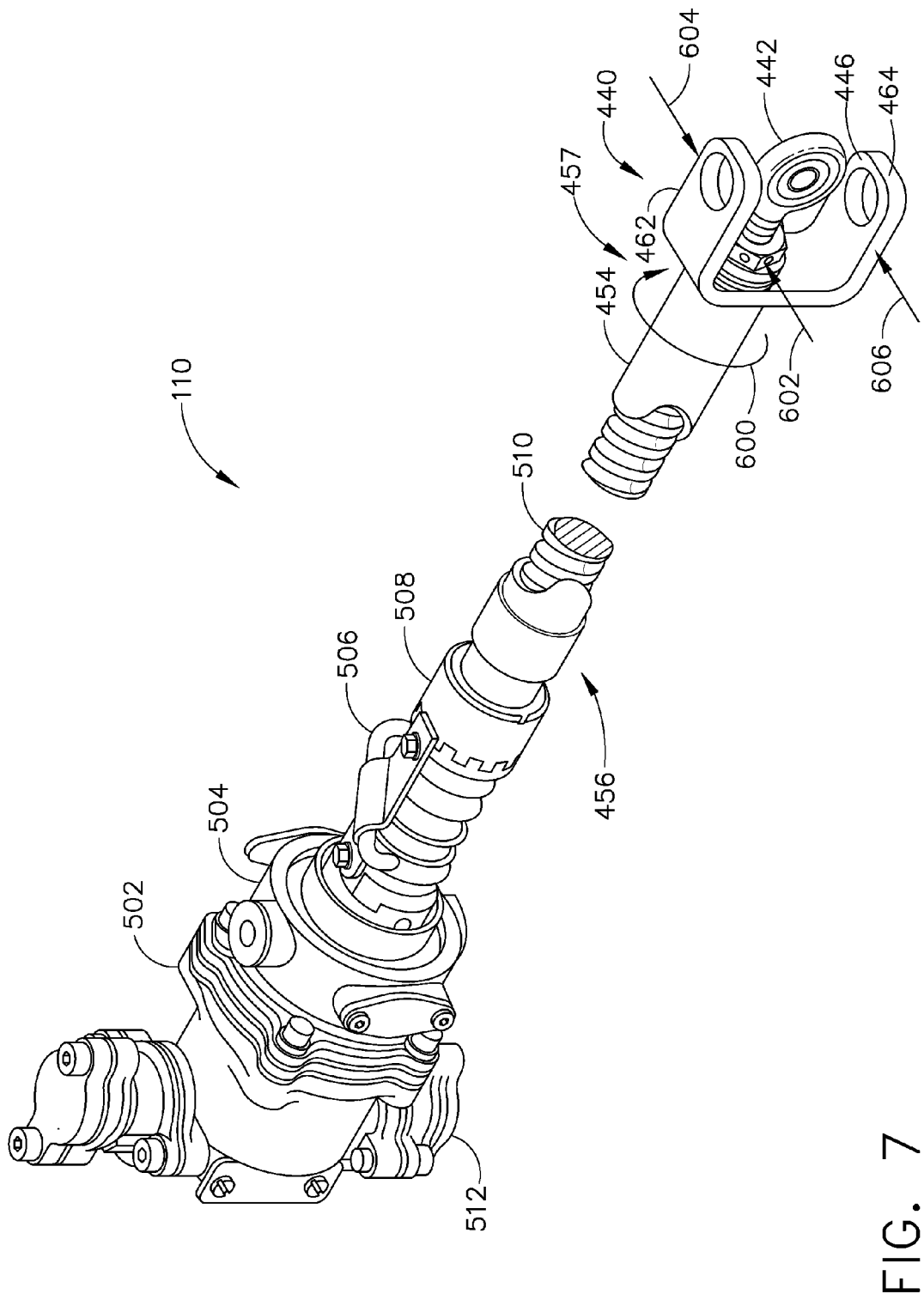

FIG. 6 is an enlarged perspective view of an exemplary cowl attachment 500 for use with thrust reverser assembly 100 (shown in FIG. 1). FIG. 7 is a partially exploded perspective view of actuator assembly 110. In the exemplary embodiment, rod end 442 is inserted into clevis bracket center cavity 430. A clevis pin 444 is inserted through front sidewall opening 432 and through rod end opening 443, such that rod end 442 is rotatably coupled to clevis bracket 412. A retaining clip 490 is coupled to front sidewall 414 such that retaining clip 490 substantially covers opening 432 and prevents clevis pin 444 from backing out of opening 432 during operation of actuator assembly 110. Torque bracket first arm 462 is inserted into bracket end cavity 428, and second arm 464 is inserted into end cavity 426. In the exemplary embodiment, first arm 462 and second arm 464 are each inserted into clevis bracket 412. Torque bracket 414 is coupled to clevis bracket 412, such that bracket arms 462 and 464 are each slideably received in one of clevis bracket cavities 426 and 428. In an alternative embodiment, either first arm 462 and/or second arm 464 is at least partially inserted into clevis bracket 412.

Referring now to FIG. 7, in the exemplary embodiment actuator assembly 110 includes a gearbox 502 that is coupled to a gimbal assembly 504, a torque tube housing 506, a ball nut 508, a ballscrew shaft 510, an extension tube 454, and a rod assembly 440. Center drive unit 116 (shown in FIG. 2) is coupled to an input shaft 512. Ballscrew shaft 510 is rotatably coupled to gearbox 502 and input shaft 512 is coupled to gearbox 502, such that center drive unit 116 imparts rotational motion to gearbox 502. Gearbox 502 transfers the rotational movement from center drive unit 116 to rotational movement of ballscrew shaft 510. Ball nut 508 is coupled to ballscrew shaft 510, such that the ball nut 508 is translated axially along ballscrew shaft 510 upon rotation of ballscrew shaft 510. Extension tube root end 456 is coupled to ball nut 508, such that extension tube 454 is movable along ballscrew shaft 510. Tip end 457 of extension tube 454 is coupled to rod assembly 440, which is coupled to aft cowl 102 (as shown in FIG. 4).

During operation of actuator assembly 110, center drive unit 116 imparts a force to gearbox 502, which in turn translates the force into rotational energy. Gearbox 502 then rotates ballscrew shaft 510 such that ball nut 508 is translated axially along ballscrew shaft 510. Extension tube 454 and rod assembly 440 are moved axially by ball nut 508 along ballscrew shaft 510 such that aft cowl 102 is moved between first position 130 and second position 134. When aft cowl 102 is moved between first position 130 and second position 134, an input torque load, represented by arrow 600, is imparted to extension tube 454 from ballscrew shaft 510. As rod assembly 440 moves aft cowl 102, rod end 442 is moved along clevis pin 444 and contacts front sidewall 414 (shown in FIG. 6) such that front sidewall 414 prevents rod end 442 from exiting clevis bracket 412. A bending load, represented by arrow 602, is imparted to rod end 442 from the torque load 600, such that bending stresses are induced to rod end 442. Torque bracket 446 transfers such bending stresses into reaction forces, represented by arrows 604 and 606, that are induced to torque bracket arms 462 and 464 and clevis bracket 412. As aft cowl 102 is moved, torque bracket 446 transfers bending loading 602 from rod end 442 to clevis bracket 412, such that rod end 442 is subjected to reduced bending stresses during operation of actuator assembly 110.

In the exemplary embodiment, when aft cowl 102 is moved towards exhaust end 36 by actuator assembly 110, torque bracket first arm 462 impacts back sidewall 416 (shown in FIG. 6) such that reaction forces 604 are induced between first arm 462 and back sidewall 416. Second arm 464 rotates adjacent to front sidewall 414 such that reaction forces 606 are induced between second arm 464 and front sidewall 414. When aft cowl 102 is moved towards inlet end 30 of gas turbine propulsion system 10, first arm 462 is moved adjacent to front sidewall 414 and second arm 464 is moved adjacent to back sidewall 416 such that bending loading 602 in rod end 442 is similarly transferred into reaction forces induced between torque bracket 446 and clevis bracket 412. In the exemplary embodiment, torque bracket 446 is oriented such that first arm 462 and second arm 464 each transfer approximately 50% of bending loading 602 into reaction forces between torque bracket 446 and clevis bracket 412. In an alternative embodiment, bending loading 602 may be at least partially transferred to clevis bracket 412 by first arm 462 and/or second arm 464.

The thrust reverser assembly described herein facilitates reducing damage to the translating cowl and gas turbine propulsion system that results from cracks in portions of the thrust reverser assembly caused by bending forces from movement of the translating cowl. More specifically, the methods and systems described herein facilitate transferring bending loadings from the thrust reverser assembly to the cowl. As such, the operational life of the thrust reverser assembly is extended, which facilitates reduced repair and maintenance costs of gas turbine propulsion systems.

The above-described system and methods facilitate reducing the bending loading induced to an actuator assembly during operation of the thrust reverser assembly. As such, the embodiments described herein facilitate a thrust reverser assembly that is less likely to be damaged during operation. As such, the performance life of the thrust reverser assembly can be extended because of the reduced likelihood of damage during operation. Further, the above described system facilitates reducing the overall cost of maintenance for aircraft gas turbine propulsion system because of the reduced downtime required for repairs and the extended operating life of the gas turbine propulsion system.

Exemplary embodiments of systems and methods for assembling a thrust reverser for a gas turbine propulsion system are described above in detail. The system and methods are not limited to the specific embodiments described herein, but rather, components of systems and/or steps of the methods may be utilized independently and separately from other components and/or steps described herein. For example, the methods may also be used in combination with other gas turbine engine systems and methods, and are not limited to practice with only the aircraft engine systems and methods as described herein. Rather, the exemplary embodiment can be implemented and utilized in connection with many other gas turbine propulsion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a thrust reverser assembly for use in an aircraft gas turbine propulsion system, said method comprising:
   coupling a translating cowl to a fixed cowling, such that the translating cowl at least partially covers an engine, and is movable between an open position and a closed position;
   coupling a rod end assembly including a rod end to the translating cowl;
   coupling an actuator to the rod end assembly, such that the actuator is movable between a first position and a second position;
   coupling a torque bracket including at least two arms to the rod end assembly wherein each arm extends outward from the rod end assembly, such that bending loading induced to the rod end assembly is at least partially induced to the translating cowl by the torque bracket;
   coupling a clevis bracket to the translating cowl; and
   coupling the torque bracket to the clevis bracket such that each arm and the rod end is at least partially inserted within a portion of the clevis bracket.

2. A method in accordance with claim 1, wherein coupling the torque bracket to the clevis bracket further comprises positioning each arm of the torque bracket at least partially in a respective cavity defined in the clevis bracket.

3. A method in accordance with claim 1, wherein coupling the torque bracket to the clevis bracket further comprises orienting each arm of the torque bracket relative to the clevis bracket such that each arm transfers about fifty percent of the bending loading induced to the rod end assembly to the translating cowl.

4. A method in accordance with claim 1, wherein coupling the actuator to the rod end assembly further comprises inserting at least a portion of an extension tube extending from the actuator through an opening defined in the torque bracket.

5. A thrust reverser assembly for use in an aircraft gas turbine propulsion system, said thrust reverser assembly comprising:
   a translating cowl at least partially covering an engine, said translating cowl slideably coupled to a fixed cowling and movable between an open position and a closed position;
   a rod end assembly including a rod end coupled to said translating cowl;
   an actuator coupled to said rod end assembly for selectively moving said translating cowl between the open and closed positions;
   a torque bracket comprising at least two arms coupled to said rod end assembly, each said arm extends outward from said rod end assembly, said torque bracket is oriented to transfer bending loading induced to said rod end assembly to said translating cowl;
   a clevis bracket coupled to the translating cowl; and
   the torque bracket coupled to the clevis bracket such that each arm and the rod end is at least partially inserted within a portion of the clevis bracket.

6. A thrust reverser assembly in accordance with claim 5 wherein said clevis bracket comprises at least two cavities defined therein.

7. A thrust reverser assembly in accordance with claim 6, wherein each of said torque bracket arms is at least partially inserted through a respective one of said clevis bracket cavities.

8. A thrust reverser assembly in accordance with claim 6, wherein said torque bracket is coupled to said clevis bracket such that each of said torque bracket arms transfers about fifty percent of the bending loading induced to said rod end assembly to said translating cowl.

9. A thrust reverser assembly in accordance with claim 5, wherein said torque bracket further comprises an opening defined between said at least two arms, said opening sized to receive at least a portion of said rod end assembly therethrough.

10. A thrust reverser assembly in accordance with claim 5, wherein said actuator comprises an extension tube, said extension tube sized to be at least partially inserted through an opening defined within said torque bracket.

11. A thrust reverser assembly in accordance with claim 5 further comprising a center drive unit coupled to said actuator, said center drive unit configured to impart rotational force to said actuator.

12. A thrust reverser assembly in accordance with claim 7 wherein said torque bracket facilitates translating bending loading from said rod end assembly to said clevis bracket.

13. A gas turbine propulsion system for use in an aircraft comprising:
   an engine comprising an inlet end and an exhaust end; and
   a thrust reverser assembly comprising:
      a translating cowl at least partially covering the engine, said translating cowl slideably coupled to a fixed cowling, said translating cowl movable between a first position and a second position, the second position defined nearer to the exhaust end than the first position;
      a rod end assembly including a rod end coupled to said translating cowl;
      an actuator coupled to said rod end assembly for selectively moving said translating cowl between the first and second positions;
      a torque bracket comprising at least two arms coupled to said rod end assembly, each said arm extends outward from said rod end assembly, said torque bracket is oriented to transfer bending loading induced to said rod end assembly to said translating cowl;
      a clevis bracket coupled to the translating cowl; and
      the torque bracket coupled to the clevis bracket such that each arm and the rod end is at least partially inserted within a portion of the clevis bracket.

14. A gas turbine propulsion system in accordance with claim 13, wherein said clevis bracket comprises at least two cavities defined therein.

15. A gas turbine propulsion system according to claim 14, wherein each of said torque bracket arms is at least partially inserted through a respective one of said clevis bracket cavities.

16. A gas turbine propulsion system according to claim 14, wherein said torque bracket is coupled to said clevis bracket such that each of said torque bracket arms transfers about fifty percent of the bending loading induced to said rod end assembly to said translating cowl.

17. A gas turbine propulsion system according to claim 13, wherein said torque bracket further comprises an opening defined between said at least two arms, said opening sized to receive at least a portion of said rod end assembly therethrough.

18. A gas turbine propulsion system according to claim 13, wherein said actuator comprises an extension tube, said extension tube sized to be at least partially inserted through an opening defined within said torque bracket.

19. A gas turbine propulsion system according to claim 13, wherein said thrust reverser assembly further comprising a center drive unit coupled to said actuator, said center drive unit configured to impart rotational force to said actuator.

* * * * *